US012676429B2

(12) United States Patent
Engbrocks

(10) Patent No.: US 12,676,429 B2
(45) Date of Patent: Jul. 7, 2026

(54) ELECTRICAL CONTACT PIECE HAVING AN INTEGRATED STOP AND ELECTRICAL CONTACT DEVICE FOR AT LEAST ONE ELECTRICAL POLE HAVING AT LEAST ONE SUCH ELECTRICAL CONTACT PIECE

(71) Applicant: Eaton Intelligent Power Limited, Dublin (IE)

(72) Inventor: Andre Engbrocks, Bonn (DE)

(73) Assignee: EATON INTELLIGENT POWER LIMITED, Dublin (IE)

( * ) Notice: Subject to any disclaimer, the term of this patent is extended or adjusted under 35 U.S.C. 154(b) by 262 days.

(21) Appl. No.: 18/552,105

(22) PCT Filed: Mar. 21, 2022

(86) PCT No.: PCT/EP2022/057379

§ 371 (c)(1),
(2) Date: Sep. 22, 2023

(87) PCT Pub. No.: WO2022/200290

PCT Pub. Date: Sep. 29, 2022

(65) Prior Publication Data

US 2024/0186726 A1 Jun. 6, 2024

(30) Foreign Application Priority Data

Mar. 23, 2021 (DE) ..................... 20 2021 101 498.9

(51) Int. Cl.
*H01R 4/48* (2006.01)
*H01R 13/502* (2006.01)

(52) U.S. Cl.
CPC ......... *H01R 4/4811* (2023.08); *H01R 4/4846* (2023.08); *H01R 13/502* (2013.01); *H01R 4/4821* (2023.08); *H01R 4/485* (2023.08)

(58) Field of Classification Search
CPC .. H01R 4/4811; H01R 4/4846; H01R 13/502; H01R 4/4821; H01R 4/485; H01R 31/08;
(Continued)

(56) References Cited

U.S. PATENT DOCUMENTS 9,922,778 B2 * 3/2018 Wu ........................ H01H 13/50
10,290,439 B2 * 5/2019 Dauer .................... H01H 9/443
(Continued)

FOREIGN PATENT DOCUMENTS

DE 7719374 U1 9/1977
DE 20211513 U1 11/2003
(Continued)

*Primary Examiner* — Abdullah A Riyami
*Assistant Examiner* — Nader J Alhawamdeh
(74) *Attorney, Agent, or Firm* — LEYDIG, VOIT & MAYER, LTD.

(57) ABSTRACT

The invention relates to an electrical contact piece having an integrated stop, an L-shaped main contact body having a long and a short arm, the long arm having fastening means for fixing the contact piece in a housing and a bent-out stop piece, and the short arm having an electrical contact surface, and at least one clamping device attached to the long arm of the main contact body for clamping an electrical conductor introduced into the contact piece between a clamping part and the long arm.

12 Claims, 5 Drawing Sheets

(58) Field of Classification Search
CPC ........... H01R 9/2408; H01H 2050/028; H01H 1/5844; H01H 50/14; H01H 50/546
See application file for complete search history.

(56) References Cited

U.S. PATENT DOCUMENTS

| | | | | |
|---|---|---|---|---|
| 2016/0240940 | A1* | 8/2016 | Wu | H01R 4/4821 |
| 2017/0110264 | A1* | 4/2017 | Wu | H01H 1/58 |
| 2019/0386409 | A1* | 12/2019 | Wu | H01R 25/006 |
| 2020/0365338 | A1* | 11/2020 | Rushabh | H01H 1/0015 |
| 2024/0186726 | A1* | 6/2024 | Engbrocks | H01R 4/4811 |

FOREIGN PATENT DOCUMENTS

| | | | |
|---|---|---|---|
| EP | 2437354 | A1 | 4/2012 |
| EP | 3399535 | A1 | 11/2018 |
| WO | 2020069981 | A1 | 4/2020 |

* cited by examiner

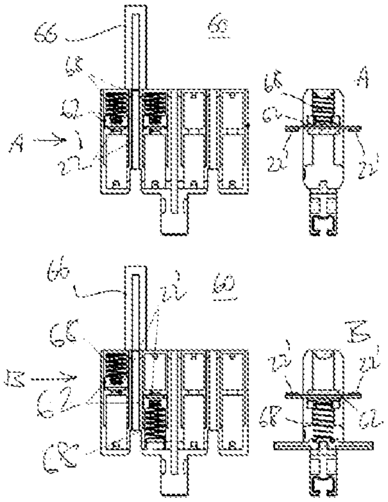
Fig. 3A
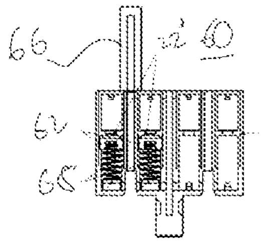
Fig. 3B
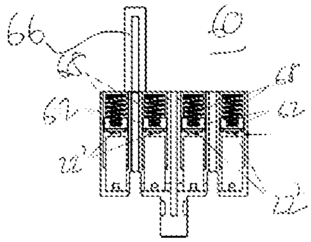
Fig. 3C
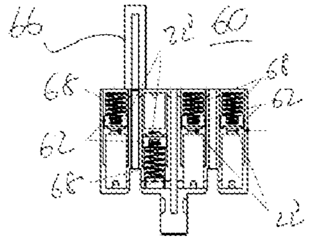
Fig. 3D
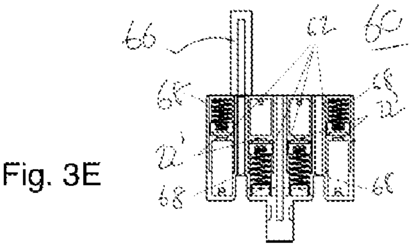
Fig. 3E
Fig. 3

ELECTRICAL CONTACT PIECE HAVING AN INTEGRATED STOP AND ELECTRICAL CONTACT DEVICE FOR AT LEAST ONE ELECTRICAL POLE HAVING AT LEAST ONE SUCH ELECTRICAL CONTACT PIECE

The present disclosure relates to an electrical contact piece with an integrated stop and an electrical contact device for at least one electrical pole with at least one such electrical contact piece.

German utility model document DE 202 11 513 U1 discloses a connection device for at least one conductor, which has a clamping spring and preferably a busbar, which is/are arranged in a metallic clamping cage, which has a shape which is angular in cross section and has at least three, preferably four side walls and is open at least one axial end, which forms an insertion opening for the conductor, wherein the clamping spring has two longitudinal arms, of which one is designed as a clamping arm, which are oriented at an acute angle to one another and connected to one another via a bend. The clamping arm has centering tips at its free end. The first longitudinal arm of the clamping spring is fastened to the inner side of the first side wall of the clamping cage and lies, in sections, directly on the inner side of the side wall, and the bending region of the clamping spring rests on at least one web integrally formed on the clamping cage. At its free end, the clamping arm has centering tips which, at least in the unconnected state, each engage in correspondingly shaped corresponding recesses in the busbar. In this way, a connection device which is particularly cost-effective and consists of few parts is realized having a clamping spring which is fixed in the clamping cage in a manner secure against being pulled out exclusively by means of functional elements formed directly on the clamping cage, all forces of the actuation being absorbed by the clamping cage, which can be introduced as a whole or as a preassembled unit into a series terminal box or can be mounted on a printed circuit board. Conductors having a wide variety of diameters, and in particular also a plurality of conductors, can be introduced easily into the connection device due to the centering devices, wherein a good contact between the at least one conductor and the busbar is always ensured. The engagement of the centering tips in the recesses also makes it possible to connect to conductors having a particularly small diameter.

The international patent application WO2020069981A1 discloses a contact insert for clamping an electrical conductor by means of a clamping spring at a clamping point. The contact insert has a contact frame which has at least one contact base and in each case a side wall arranged at an angle to the contact base. The side walls extend substantially parallel to one another and a receiving space is formed between the side walls, in which receiving space the clamping spring is arranged. The clamping spring has a contact arm, a spring bend adjoining the contact arm, and a clamping arm adjoining the spring bend. The contact arm is fastened to one or both side walls or at least one fastening wall adjoining one or both side walls, and the clamping arm is pre-tensioned relative to the contact base. The clamping point for the electrical conductor to be clamped is formed between the clamping arm and the contact base. The contact insert can be used universally, both as an independent structural unit and as part of a conductor terminal or an arrangement with a busbar. The contact insert can in particular be used as a modular contact insert which can be used as a modular assembly in other devices, such as the previously mentioned arrangement with the busbar or in the conductor connection terminal.

US patent application US2019386409A1 relates generally to a modularized structure of a switching wire connection device and in particular to a modularized structure of a switching wire connection device comprising a mounting support and a plurality of modularized wire connection modules. The modularized wire connection modules are removably mounted on the mounting support as an integrated body.

European patent application EP3399535A1 relates to an electrical contact or LED unit comprising a housing in which at least one pair of electrical contacts is accommodated and which has a housing for an actuating element and/or for an LED that defines a longitudinal axis of the development, one or more pairs of terminals for wiring the electrical contacts and their connection to an electrical circuit, wherein the terminals are accessible through corresponding holes of the housing for introducing the wiring terminals, and each has an elastic blade coupled to a corresponding electric contact.

An electrical contact piece with an integrated stop and an electrical contact device for at least one electrical pole with at least one such electrical contact piece are described below.

In accordance with one aspect of the present disclosure, an electrical contact piece having an integrated stop is provided comprising the following: an L-shaped main contact body having a long arm and a short arm, the long arm having fastening means for fixing the contact piece in a housing and a bent-out stop piece, and the short arm having an electrical contact surface, and at least one clamping device attached to the long arm of the main contact body for clamping an electrical conductor introduced into the contact piece between a clamping part and the long arm. The stop piece is bent out from the main contact body such that the insertion depth of an electrical conductor into the contact piece is limited by the bent-out stop piece in such a way that uncontrolled and too-deep insertion can be prevented. Such a contact piece can be produced relatively easily from few materials and does not require a large amount of space in a housing. The integrated stop can prevent an electrical conductor from being inserted unintentionally too far into the contact piece and thus into a housing in which the contact piece is arranged.

According to a further aspect of the present disclosure, an electrical contact device for at least one electrical pole is provided, which comprises the following: at least one contact piece as disclosed herein per electrical pole and an electrically insulating housing for receiving and holding the at least one contact piece. This contact device can in particular be used for controlling electrical loads such as motors which are connected to a plurality of electrical poles for operation.

Further features result from the following description in connection with the exemplary embodiments shown in the drawings.

In the drawings:

FIG. 3 shows various embodiments of contact actuation devices for an electrical contact device as shown in FIGS. 2A and 2B.

In the following description, identical, functionally identical and functionally related elements can be provided with the same reference signs. Absolute values are only given as examples in the following and are not to be understood as limiting.

Figure 1A:
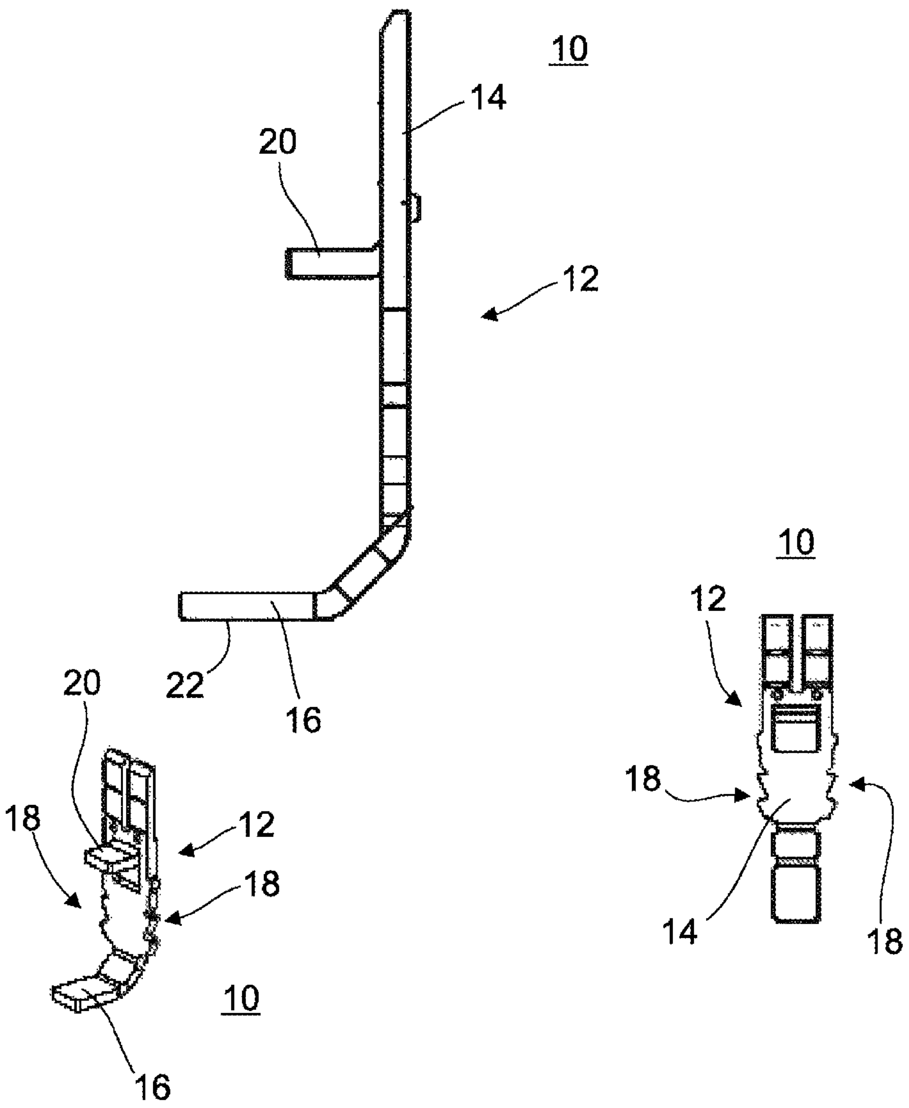
FIGS. 1A and 1B show an embodiment of an electrical contact piece for a plug terminal.
Figure 1B:
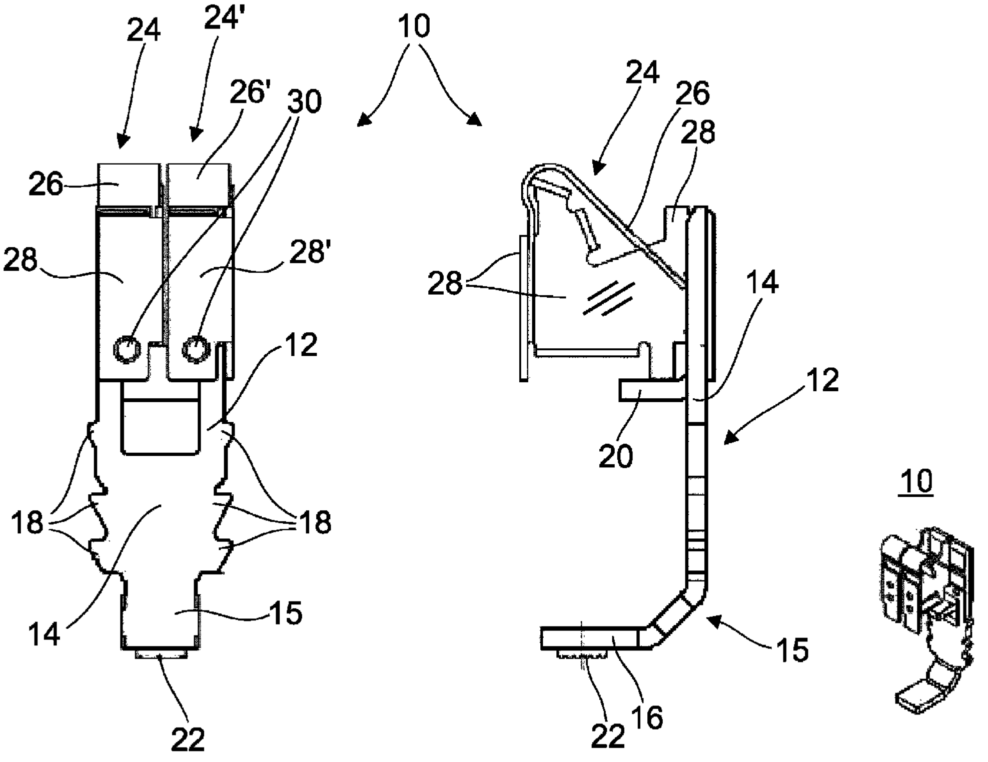

FIGS. 1A and 1B show an electrical contact piece 10 with an integrated stop for an electrical conductor, which is clamped into the contact piece 10. Such a contact piece is also known as a push-in or insertion terminal. The contact piece 10 has an L-shaped main contact body 12 with a long arm 14 and a short arm 16. The main body 12 can be produced as a punched-out and bent one-piece workpiece from a copper alloy or another material, which can be dimensioned for receiving and mounting in a housing, for example of an auxiliary device as described below, thereby enabling simple electrical connection possibilities by insertion clamps.

The long arm 14 has fastening means 18 for fixing the contact piece in a housing and a stop piece 20 for an electrical conductor which is bent out from the main body 12. Due to the bent stop piece 20, the insertion depth of an electrical conductor into the contact piece 10 is limited, so that uncontrolled and too-deep insertion can be prevented.

Two clamping devices 24, 24' are attached in parallel on the long arm 14 of the main contact body 12, and serve to clamp an electrical conductor introduced into the contact piece between a clamping part 26, 26' and the long arm 14.

On the short arm 16 there is provided an electrical contact surface 22, for example a copper piece 22 welded onto the short arm 16. The contact surface 22 is provided in particular for contacting a contact bridge 62, 62' (FIGS. 2A, 2B).

Figure 2A:
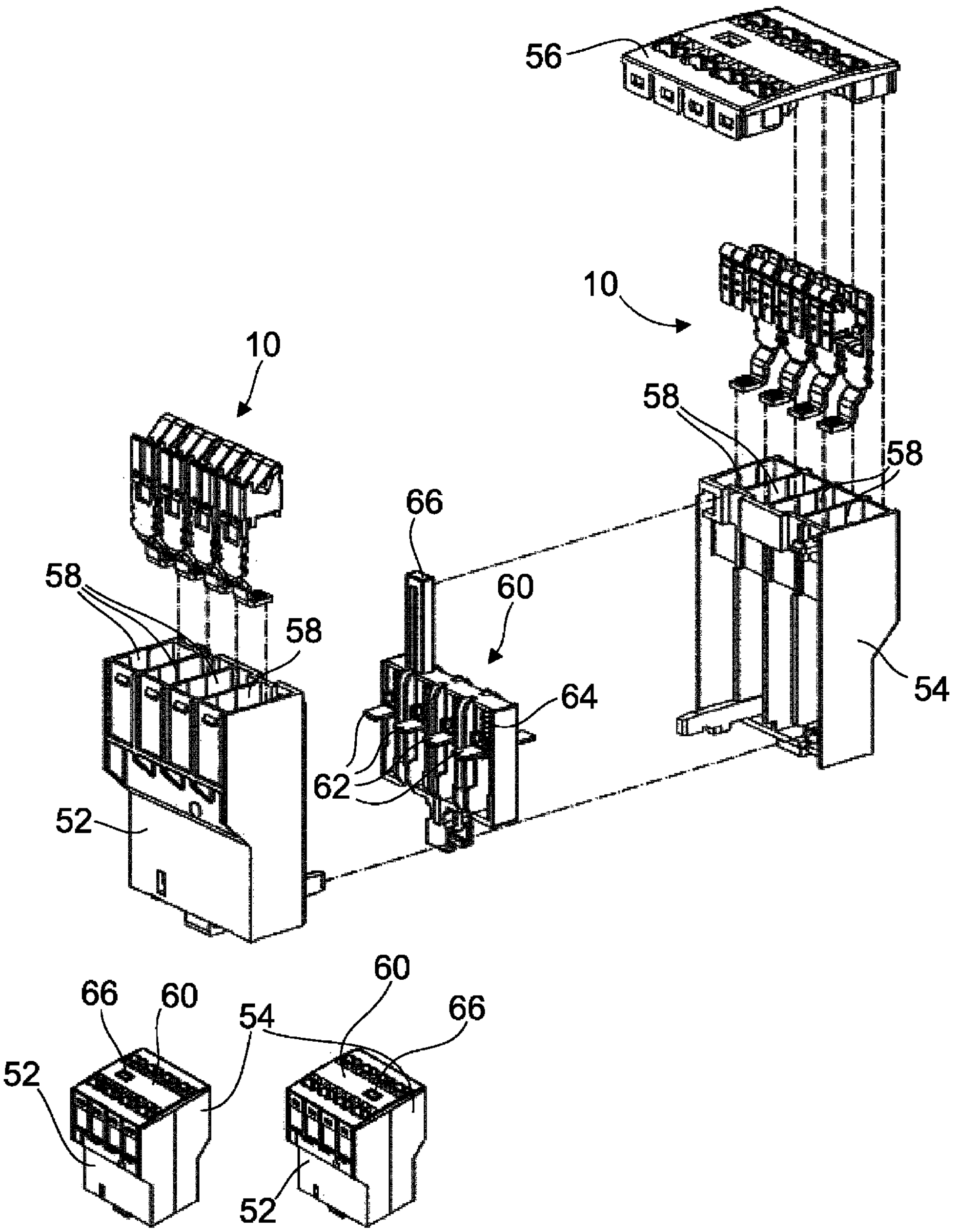
FIGS. 2A and 2B show embodiments of electrical contact devices with multiple electrical contact pieces.
Figure 2B:
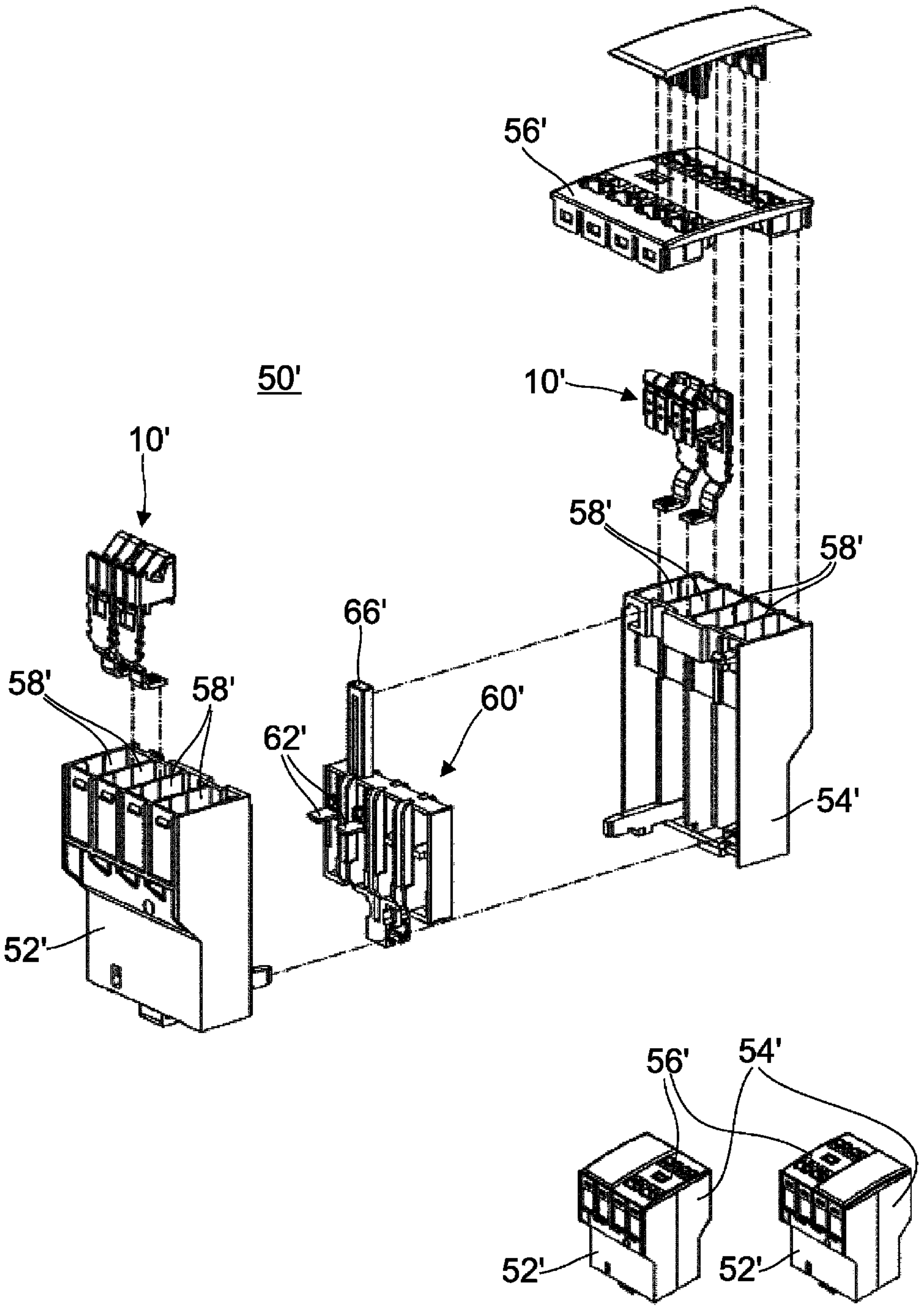

Between the long arm 14 and the short arm 16 there is provided a transition region 15, which is capable of being adapted to a support in a housing in which the contact piece is to be mounted, and in particular can have a gradation (FIGS. 2A, 2B).

The two clamping devices 24, 24' attached in parallel on the long arm 14 each have a contact spring 26, 26', which is mounted on a clamping holder 28 that is fixed on the long arm 16 in particular by means of one or more rivets 30 or screws.

The fastening means for fixing the contact piece in a housing have a plurality of claws 18 that are designed to hook onto walls of the housing and are each provided on the narrow sides of the long arm in the vicinity of the transition region 15. The claws 18 are arranged in the shape of a fir tree in such a way that the contact piece 10 is prevented from being pulled out of a housing.

FIGS. 2A and 2B each show an electrical contact device 50, 50' for at least one electrical pole. Each contact device 50, 50' has a plurality of contact pieces 10, 10', in particular those shown in FIGS. 1A and 1B. Two contact pieces 10, 10' are provided per electrical pole.

The contact device 50, 50' also has an electrically insulating housing, which comprises two housing halves 52, 54 or 52', 54' and a cover 56, 56'. The contact pieces 10, 10' are accommodated and held in both housing halves 52, 54 or 52', 54'. For each contact piece 10, 10', a separate chamber 58, 58' is provided for this purpose in the respective housing halves 52, 54 or 52', 54', into which the contact pieces 10, 10' can be introduced and fixed therein by the claws 18. The chambers 58, 58' are at least partially electrically insulated from one another, so that no electrical contact can occur between contact pieces 10, 10' mounted in adjacent chambers 58, 58', and also no sparkover can occur at higher electrical voltages.

In the assembled state of the housing halves 52, 54 or 52', 54', the chambers 58, 58' of the housing halves 52, 54 or 52', 54' are situated opposite each other. Between the housing halves 52, 54 or 52', 54', a contact actuation device 60, 60' is arranged that has a movable contact bridge 62, 62' per pair of contact pieces 10, 10' arranged opposite each other, i.e. per pole, for electrically connecting the oppositely situated contact pieces 10, 10'.

A movable contact bridge 62, 62' can be held in a first position by means of restoring means 64, for example tension springs. The contact actuating device 60, 60' can have an actuating means 66, 66' and holding means which are designed to bring the contact bridges 62, 62' from the first position into a second position and hold them there. As a result, contact pieces 10, 10' arranged opposite each other in the two housing halves 52, 54 or 52', 54' are electrically connected via the respective contact bridge 62, 62', so that an electrical current can flow.

As can be seen in FIGS. 2A and 2B, the movable contact bridges 62, 62' are arranged so as to be linearly movable in the contact actuating device 60, 60'.

FIG. 3 shows the contact actuating device 60 with different arrangements of two or four contact bridges 62. In the two uppermost representations, the contact actuating device 60 is also shown in a side view A. It is clearly evident there that the contact bridges 62 project beyond the width of the contact actuating device 60 and, in the installed state of the contact actuating device 60, project into the chambers 58 in the housing of the contact device 50 in such a way that contact surfaces 22' provided on the contact bridges 62 can contact the corresponding contact surfaces 22 of the contact pieces 12 accommodated in the chambers 50.

The invention claimed is:

1. An electrical contact piece having an integrated stop, comprising:

an L-shaped main contact body having a long arm and a short arm, wherein the long arm has fastening means for fixing the electrical contact piece in a housing and a bent-out stop piece and the short arm has an electrical contact surface; and at least one clamping device attached to the long arm of the L-shaped main contact body for clamping an electrical conductor introduced into the electrical contact piece between a clamping part and the long arm, wherein the bent-out stop piece is bent out from the L-shaped main contact body such that an insertion depth of an electrical conductor into the electrical contact piece is limited by the bent-out stop piece in such a way that uncontrolled and too-deep insertion is prevented.

2. The electrical contact piece according to claim 1, wherein the L-shaped main body further comprises, between the long arm and the short arm, a transition region that has a gradation.

3. The electrical contact piece according to claim 1, further comprising two clamping devices attached in parallel on the long arm.

4. The electrical contact piece according to claim 1, wherein the at least one clamping device has a contact spring mounted on a clamping holder that is fixed on the long arm by one or more rivets.

5. The electrical contact piece according to claim 1, wherein the fastening means for fixing the electrical contact piece in a housing have claws which are designed to hook onto walls of the housing.

6. An electrical contact device for at least one electrical pole, the electrical contact device comprising:

at least one electrical contact piece according to claim 1 per electrical pole; and an electrically insulating housing receiving and holding the at least one electrical contact piece.

7. The electrical contact device according to claim 6, wherein the housing has a plurality of chambers with a separate chamber for each of the at least one electrical contact piece, and all of the chambers are at least partially electrically insulated from one another.

8. The electrical contact device according to claim 7, wherein the housing has two housing halves, at least one chamber for at least one contact piece being provided in each housing half, the chambers of the housing halves being situated opposite each other in an assembled state of the housing halves, and a contact actuation device being able to be arranged between the housing halves and having, per pair of contact pieces situated opposite each other, at least one movable contact bridge for electrically connecting contact pieces situated opposite each other.

9. The electrical contact device according to claim 8, wherein the at least one movable contact bridge is held in a first position by restoring means and the contact actuation device has at least one actuating means and holding means which are designed to bring and hold at least one movable contact bridge from the first position to a second position.

10. The electrical contact device according to claim 8, wherein the at least one movable contact bridge is linearly movable.

11. An electrical contact piece having an integrated stop, comprising:

an L-shaped main contact body having a long arm and a short arm, wherein the long arm has fastening means for fixing the electrical contact piece in a housing and a bent-out stop piece and the short arm has an electrical contact surface; and at least one clamping device attached to the long arm of the L-shaped main contact body for clamping an electrical conductor introduced into the electrical contact piece between a clamping part and the long arm, wherein the bent-out stop piece is bent out from the L-shaped main contact body such that an insertion depth of an electrical conductor into the electrical contact piece is limited by the bent-out stop piece in such a way that uncontrolled and too-deep insertion is prevented, and wherein the fastening means for fixing the electrical contact piece in a housing have claws which are designed to hook onto walls of the housing.

12. An electrical contact device for at least one electrical pole, comprising:

at least one electrical contact piece per electrical pole, the at least one electrical contact piece comprising:

an integrated stop;

an L-shaped main contact body having a long arm and a short arm, wherein the long arm has fastening means for fixing the at least one electrical contact piece in a housing and a bent-out stop piece and the short arm has an electrical contact surface; and at least one clamping device attached to the long arm of the L-shaped main contact body for clamping an electrical conductor introduced into the at least one electrical contact piece between a clamping part and the long arm, wherein the bent-out stop piece is bent out from the L-shaped main contact body such that an insertion depth of an electrical conductor into the at least one electrical contact piece is limited by the bent-out stop piece in such a way that uncontrolled and too-deep insertion is prevented; and an electrically insulating housing for receiving and holding the at least one electrical contact piece, wherein the housing has a separate chamber for each of the at least one electrical contact piece and all the chambers are at least partially electrically insulated from one another.

* * * * *